United States Patent
Shen et al.

(10) Patent No.: US 9,880,280 B2
(45) Date of Patent: Jan. 30, 2018

(54) OBJECT DETECTION METHOD AND OBJECT DETECTOR USING THE SAME

(71) Applicant: Wistron Corporation, New Taipei (TW)

(72) Inventors: Tzu-Chiang Shen, New Taipei (TW); Hui-Chen Lin, New Taipei (TW); Meng-Chao Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 454 days.

(21) Appl. No.: 14/557,370

(22) Filed: Dec. 1, 2014

(65) Prior Publication Data

US 2016/0018522 A1 Jan. 21, 2016

(30) Foreign Application Priority Data

Jul. 18, 2014 (TW) .............................. 103124822 A

(51) Int. Cl.
| | |
|---|---|
| *G01S 17/50* | (2006.01) |
| *G01S 17/02* | (2006.01) |
| *G01S 17/08* | (2006.01) |
| *G01S 17/48* | (2006.01) |
| *G01S 7/481* | (2006.01) |

(52) U.S. Cl.
CPC ............ *G01S 17/50* (2013.01); *G01S 17/026* (2013.01); *G01S 17/08* (2013.01); *G01S 17/48* (2013.01); *G01S 7/4813* (2013.01)

(58) Field of Classification Search
CPC . G01S 17/42; G01S 17/00; G01S 3/78; G01S 3/783
See application file for complete search history.

(56) References Cited

U.S. PATENT DOCUMENTS

| | | | | |
|---|---|---|---|---|
| 5,825,481 A | * | 10/1998 | Alofs | G01S 3/783 356/138 |
| 2006/0237633 A1 | * | 10/2006 | Fouquet | G01S 17/46 250/221 |

FOREIGN PATENT DOCUMENTS

TW 355213 4/1999

OTHER PUBLICATIONS

Office action dated Sep. 1, 2015 for the Taiwan application No. 1031482, filing date: Jul. 18, 2014, p. 1 line 12-14, p. 2-4, and p. 5 line 1.

* cited by examiner

*Primary Examiner* — Luke D Ratcliffe
(74) *Attorney, Agent, or Firm* — Winston Hsu

(57) ABSTRACT

An object detection method includes, in turn, enabling a first light source, a second light source and a third light source to transmit a first light wave signal, a second light wave signal and a third light wave signal; in turn, receiving the first light wave signal, the second light wave signal and the third light wave signal reflected by an object to determine strengths of the first light wave signal, the second light wave signal and the third light wave signal, respectively; and determining a first displacement of the object along a first direction according to strength variances of the first light wave signal and the second light wave signal, and determining a second displacement of the object along a second direction according to strength variances of the first light wave signal and the third light wave signal, wherein the first direction is substantially perpendicular to the second direction.

17 Claims, 14 Drawing Sheets

OBJECT DETECTION METHOD AND OBJECT DETECTOR USING THE SAME

BACKGROUND OF THE INVENTION

1. Field of the Invention

The present invention relates to an object detection method and an object detector using the same, and more particularly, to an object detection method and an object detector capable of detecting gestures of a user.

2. Description of the Prior Art

With advancements in technology, remote control technology has become common in our daily life. Modern remote control technology is commonly utilized to remotely control household appliances such as televisions, video players and air conditioners. The remote controllers mainly utilize infrared as a communication medium, wherein a user operates the buttons on the remote controller to transmit corresponding infrared signals to the household appliances. For example, a user may perform operations such as power on/off, program selection, volume control and menu management via a remote controller of a television.

Under several conditions, for example if the user's hands are dirty, it may be inconvenient to touch the buttons on the remote controller. Most interactive displays set up in public areas do not provide contact-type control with remote controllers and physical buttons. Thus, there is a need to provide an object detection method and an object detector to realize contactless operations.

SUMMARY OF THE INVENTION

It is therefore an objective of the present invention to provide an object detection method and object detector using the same, which are capable of operating an electronic device by detecting gestures of a user, in order to realize contactless operations.

The present invention discloses an object detection method for an electronic device. The object detection method comprises: enabling, in turn, a first light source, a second light source and a third light source to transmit a first light wave signal, a second light wave signal and a third light wave signal, respectively; receiving, in turn, the first light wave signal, the second light wave signal and the third light wave signal reflected by an object to determine strengths of the first light wave signal, the second light wave signal and the third light wave signal, respectively; and determining a first displacement of the object along a first direction according to variations of the strengths of the first light wave signal and the second light wave signal reflected by the object, and determining a second displacement of the object along a second direction according to variations of the strengths of the first light wave signal and the third light wave signal reflected by the object, wherein the first direction is substantially perpendicular to the second direction.

The present invention further discloses an object detection method for an electronic device. The objection detection method comprises: enabling, in turn, a first light source, a second light source and a third light source to transmit a first light wave signal, a second light wave signal and a third light wave signal, respectively; receiving, in turn, the first light wave signal, the second light wave signal and the third light wave signal reflected by an object via a receiver to determine strengths of the first light wave signal, the second light wave signal and the third light wave signal, respectively; obtaining a first distance, a second distance and a third distance corresponding to the first light wave signal, the second light wave signal and the third light wave signal, respectively, according to strengths of the first light wave signal, the second light wave signal and the third light wave signal reflected by the object; obtaining a location of a center of a first sphere according to a location of the receiver and a location of the first light source, obtaining a location of a center of a second sphere according to the location of the receiver and a location of the second light source, and obtaining a location of a center of a third sphere according to the location of the receiver and a location of the third light source; setting up a first hemisphere with a center at the center of the first sphere and a radius equal to the first distance, setting up a second hemisphere with a center at the center of the second sphere and a radius equal to the second distance, and setting up a third hemisphere with a center at the center of the third sphere and a radius equal to the third distance; and determining that the object is located at an intersection point of the first hemisphere, the second hemisphere and the third hemisphere.

The present invention further discloses an object detector, which comprises a first light source, a second light source and a third light source, for transmitting a first light wave signal, a second light wave signal and a third light wave signal, respectively; a receiver, for receiving the first light wave signal, the second light wave signal and the third light wave signal reflected by an object; a processing means; and a storage unit, for storing a program for instructing the processing means to execute the following steps: in turn, enabling the first light source, the second light source and the third light source to, in turn, transmit the first light wave signal, the second light wave signal and the third light wave signal; determining strengths of the first light wave signal, the second light wave signal and the third light wave signal reflected by the object according to the first light wave signal, the second light wave signal and the third light wave signal received by the receiver; and determining a displacement of the object according to the strengths of the first light wave signal, the second light wave signal and the third light wave signal reflected by the object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
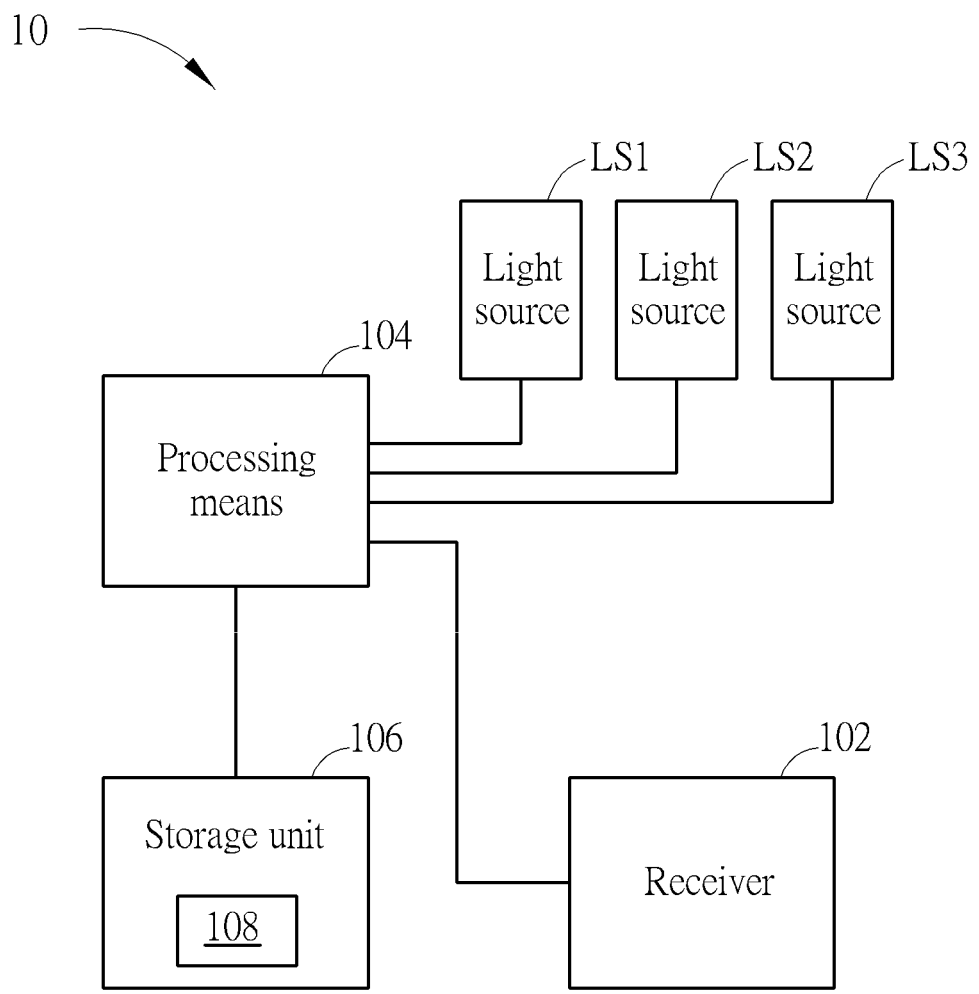
FIG. 1 is a schematic diagram of an object detector according to an embodiment of the present invention.

FIG. 1 is a schematic diagram of an object detector 10 according to an embodiment of the present invention. The object detector 10 includes light sources LS1-LS3, a receiver 102, a processing means 104 and a storage unit 106. The object detector 10 may be disposed in an electronic device for performing object detection. The electronic device may be a mobile phone, a laptop, a tablet, an e-book or a household appliance such as a television, a display, a video player, an air conditioner. The light sources LS1-LS3 are utilized for transmitting light wave signals S1-S3, respectively. The receiver 102 is utilized for receiving light wave signals S1-S3 reflected by an object. The light wave signals S1-S3 may be infrared signals, so that each of the light sources LS1-LS3 may be an infrared transmitter, such as an infrared light emitting diode (IR LED), and the receiver 102 may be an infrared receiver. In other embodiments, the light wave signals S1-S3 may also be signals with other wavelengths or of other types. As long as the signals can be reflected by an external object to detect the location of the object, the type of the signals should not be limited in the present invention. Arrangements of the light sources LS1-LS3 and the receiver 102 may also be adjusted according to different types of signals; this is not limited herein. The storage unit 106 is utilized for storing a program 108, which may instruct the processing means 104 to execute an object detection method. The processing means 104 may include, but should not be limited to, a central processing unit (CPU), microprocessor and micro control unit (MCU). The storage unit 106 may include, but should not be limited to, a read-only memory (ROM), flash memory, random-access memory (RAM), CD-ROM, DVD-ROM, magnetic tape, hard disk drive and optical data store device.

Figure 2:
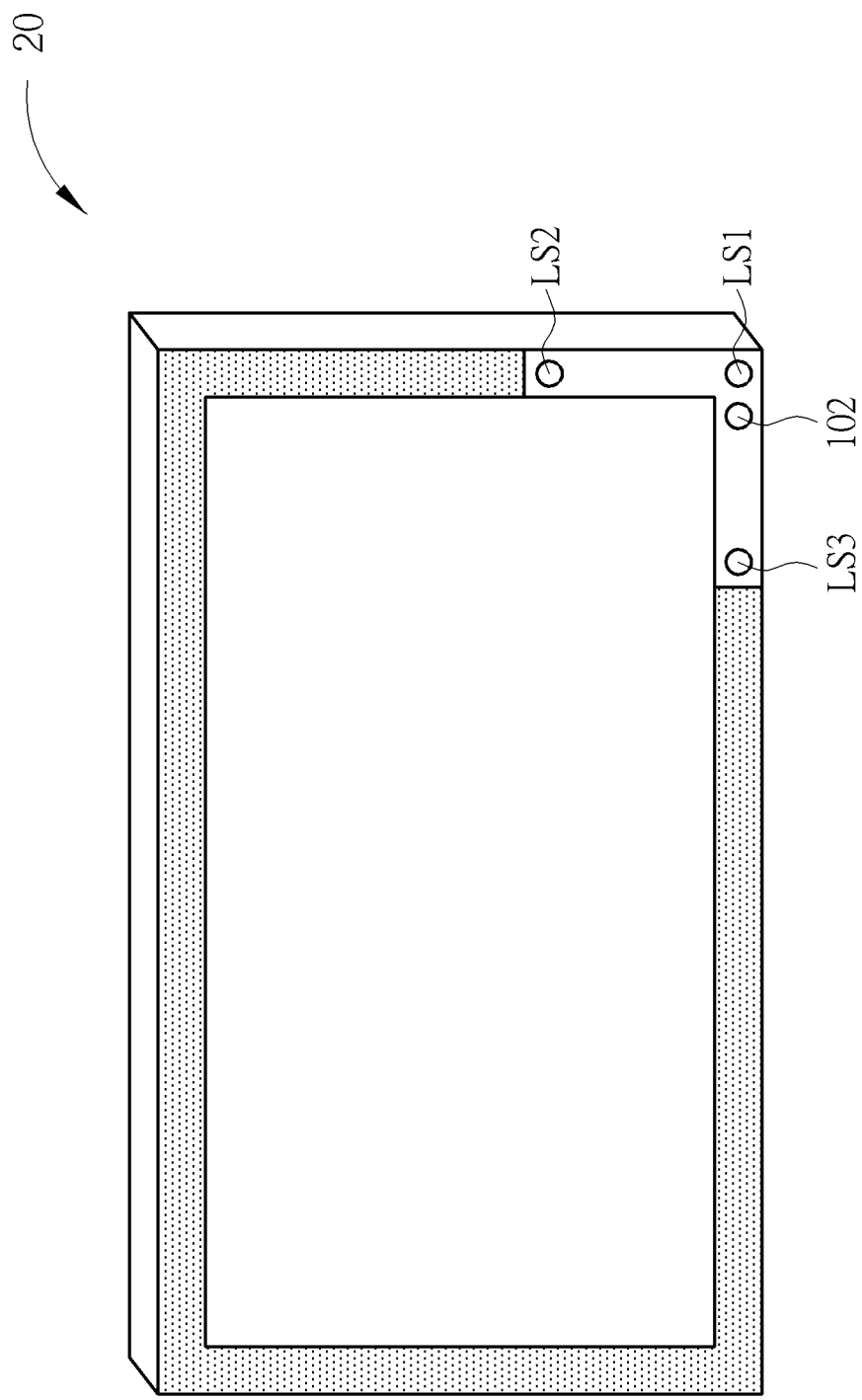
FIG. 2 is a schematic diagram of an electronic device having the object detector according to an embodiment of the present invention.

Preferably, if the electronic device is a display, the light sources LS1-LS3 and the receiver 102 may be disposed in a corner of the display. FIG. 2 is a schematic diagram of an electronic device 20 having the object detector 10 according to an embodiment of the present invention. In FIG. 2, the light sources LS1-LS3 and the receiver 102 of the object detector 10 are disposed in the lower right corner of the electronic device 20 in an L-shape. The light source LS1 is located in the vertex of the lower right corner of the electronic device 20. The light source LS2 is located above the light source LS1. The light source LS3 is located in the left hand side of the light source LS1. The receiver 102 is next to the light source LS1. In other embodiments, the light sources LS1-LS3 and the receiver 102 may be disposed in other corners by similar methods. If the electronic device is of another type, the light sources LS1-LS3 and the receiver 102 may be disposed in a proper manner adaptive to the structure the electronic device; this is not limited herein.

Figure 3:
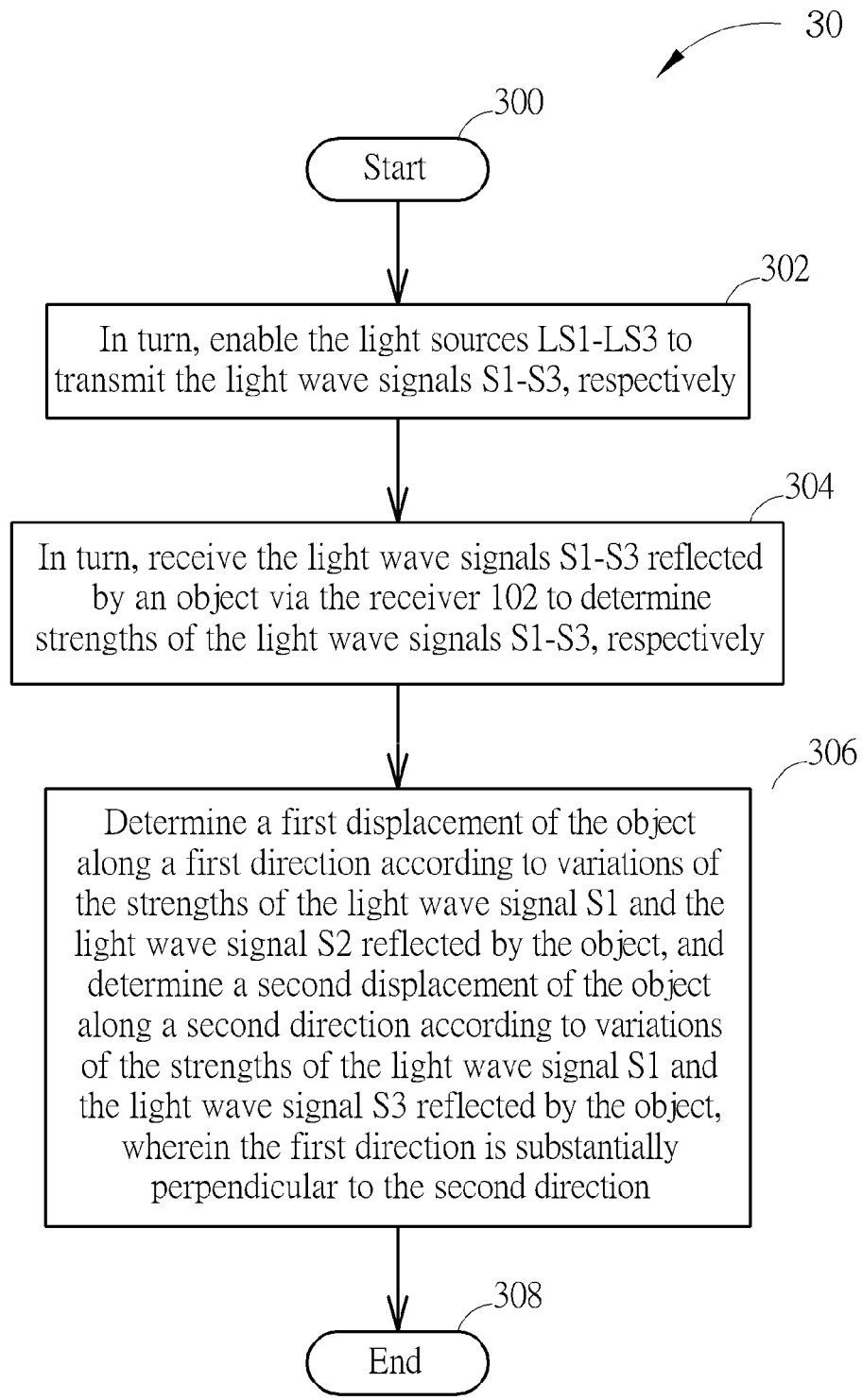
FIG. 3 is a schematic diagram of a process according to an embodiment of the present invention.

FIG. 3 is a schematic diagram of a process 30 according to an embodiment of the present invention. The process 30 is utilized in the object detector 10 for object detection. The process 30, which may be compiled into the program 108, includes the following steps:

Step 300: Start.

Step 302: In turn, enable the light sources LS1-LS3 to transmit the light wave signals S1-S3, respectively.

Step 304: In turn, receive the light wave signals S1-S3 reflected by an object via the receiver 102 to determine strengths of the light wave signals S1-S3, respectively.

Step 306: Determine a first displacement of the object along a first direction according to variations of the strengths of the light wave signal S1 and the light wave signal S2 reflected by the object, and determine a second displacement of the object along a second direction according to variations of the strengths of the light wave signal S1 and the light wave signal S3 reflected by the object, wherein the first direction is substantially perpendicular to the second direction.

Step 308: End.

Figure 4:
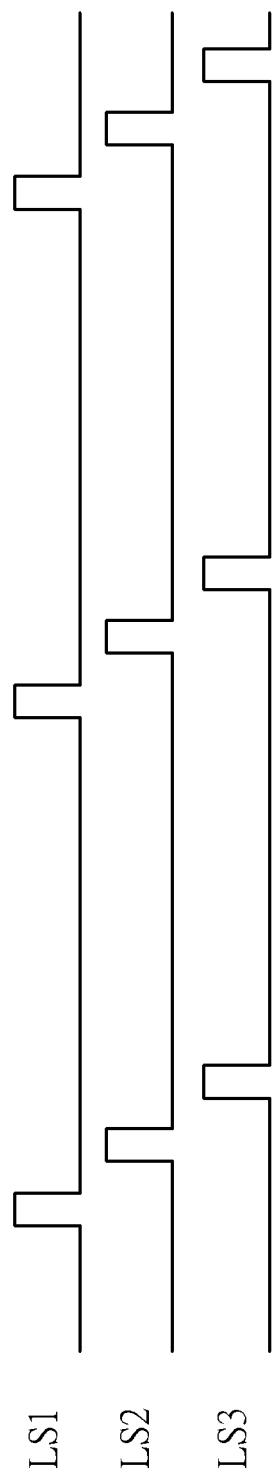
FIG. 4 is a schematic diagram of control signals for enabling the light sources according to an embodiment of the present invention.

According to the process 30, the processing means 104 may, in turn, enable the light sources LS1-LS3 to transmit the light wave signals S1-S3, respectively. The receiver 102 then, in turn, receives the light wave signals S1-S3 reflected by an object to determine the strengths of the light wave signals S1-S3 reflected by the object. Preferably, the processing means 104 may respectively enable the light sources LS1-LS3 in different time slots, in order to transmit the light wave signals S1-S3 with time-division. The related control signals are shown in FIG. 4. Since the light wave signals S1-S3 are transmitted with time-division, the receiver 102 may only receive a light wave signal transmitted by one of the light sources LS1-LS3 at one time. When the receiver 102 receives a light wave signal, the processing means 104 may determine that the received light wave signal is the reflection result of one of the light wave signals S1-S3 according to the receiving time.

Figure 5:
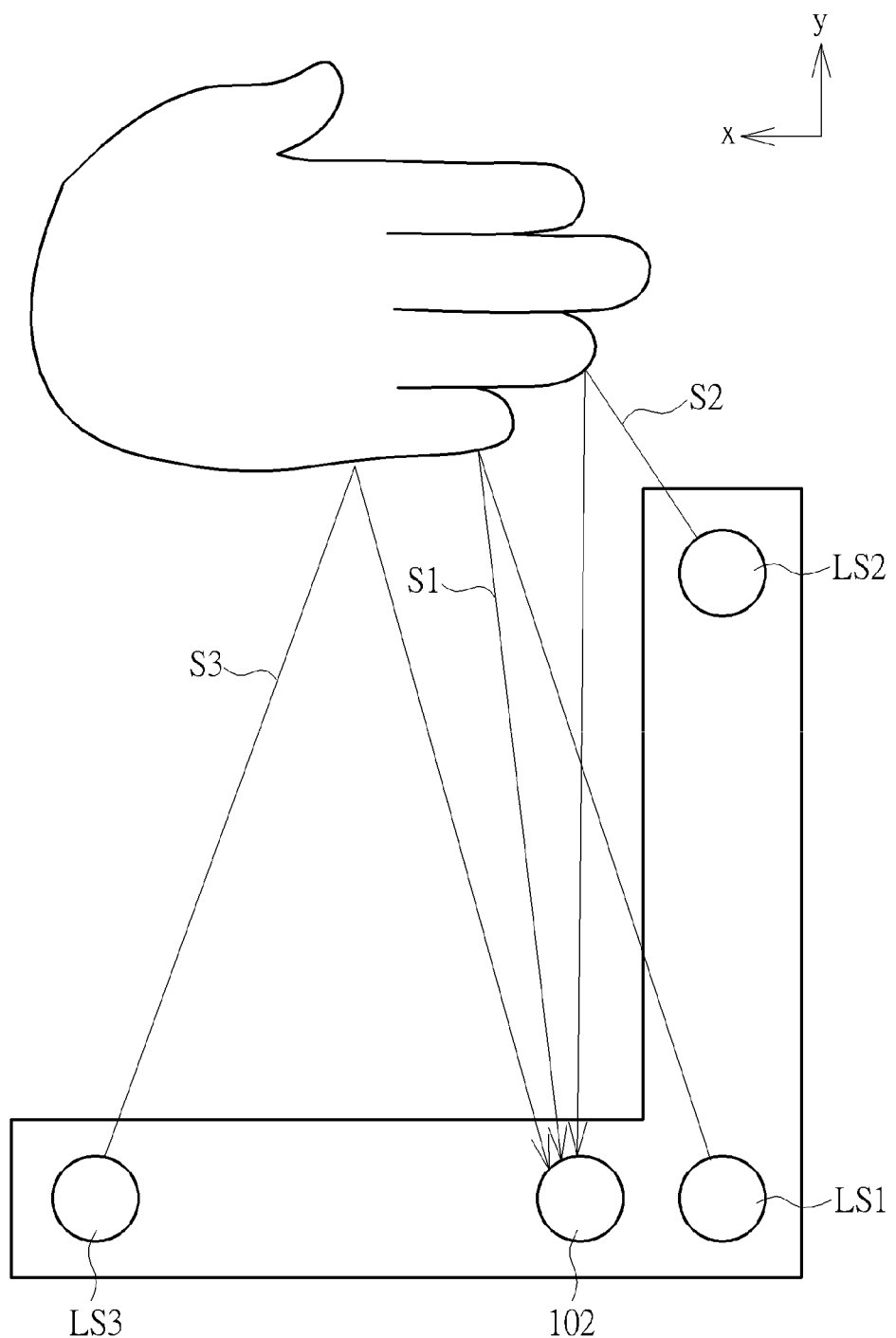
FIG. 5 is a schematic diagram of the light wave signals reflected by an object according to an embodiment of the present invention.

FIG. 5 is a schematic diagram of the light wave signals S1-S3 reflected by an object according to an embodiment of the present invention. The object may be the hand of a user; that is, the user may control the operations of the electronic device (e.g. a television) via gestures instead of a remote controller. The object detector 10 may detect the gesture of the user to perform various operations such as power on/off, program selection, volume control and menu management of the television. In such a situation, if the object detector 10 and the remote controller both utilize infrared light as the transmitted light wave signals, the receiver 102 may receive the infrared light reflected by the object (i.e. the hand), and also receive the infrared signals transmitted by the remote controller. The gesture control and the input of the remote controller may be integrated into the object detector 10, so that the back-end circuits may not need to perform signal processing in different ways, which increases the convenience.

According to the process 30, the processing means 104 may determine the strengths of the light wave signals S1-S3 reflected by the object after the receiver 102 receives the light wave signals S1-S3 reflected by the object. The processing means 104 then determines a first displacement of the object along a first direction according to variations of the strengths of the light wave signal S1 and the light wave signal S2 reflected by the object, and determines a second displacement of the object along a second direction according to variations of the strengths of the light wave signal S1 and the light wave signal S3 reflected by the object, wherein the first direction is substantially perpendicular to the second direction. As shown in FIG. 5, the light source LS2 is located above the light source LS1; hence, the processing means 104 may determine the displacement of the object along the y-axis (i.e. upward or downward displacement) according to the variations of the strengths of the light wave signal S1 and the light wave signal S2 reflected by the object. The light source LS3 is located in the left hand side of the light source LS1; hence, the processing means 104 may determine the displacement of the object along the x-axis (i.e. leftward or rightward displacement) according to the variations of the strengths of the light wave signal S1 and the light wave signal S3 reflected by the object. More specifically, the strengths of the light wave signals S1-S3 received by the receiver 102 may increase to a higher value when the object approaches the front of the object detector 10. The processing means 104 can thereby set a threshold value TH corresponding to the received light wave signals S1-S3, in order to determine whether the object approaches the front of the object detector 10. When any of the reflected light wave signals S1-S3 exceeds the threshold value TH, there may be an object approaching the front of the object detector 10. The processing means 104 can thereby determine the moving direction of the object according to the variations of the strengths of the light wave signals S1-S3 and their sequence, and then perform corresponding operations accordingly (e.g. power on/off, program selection, volume control and menu management of the television).

Figure 6:
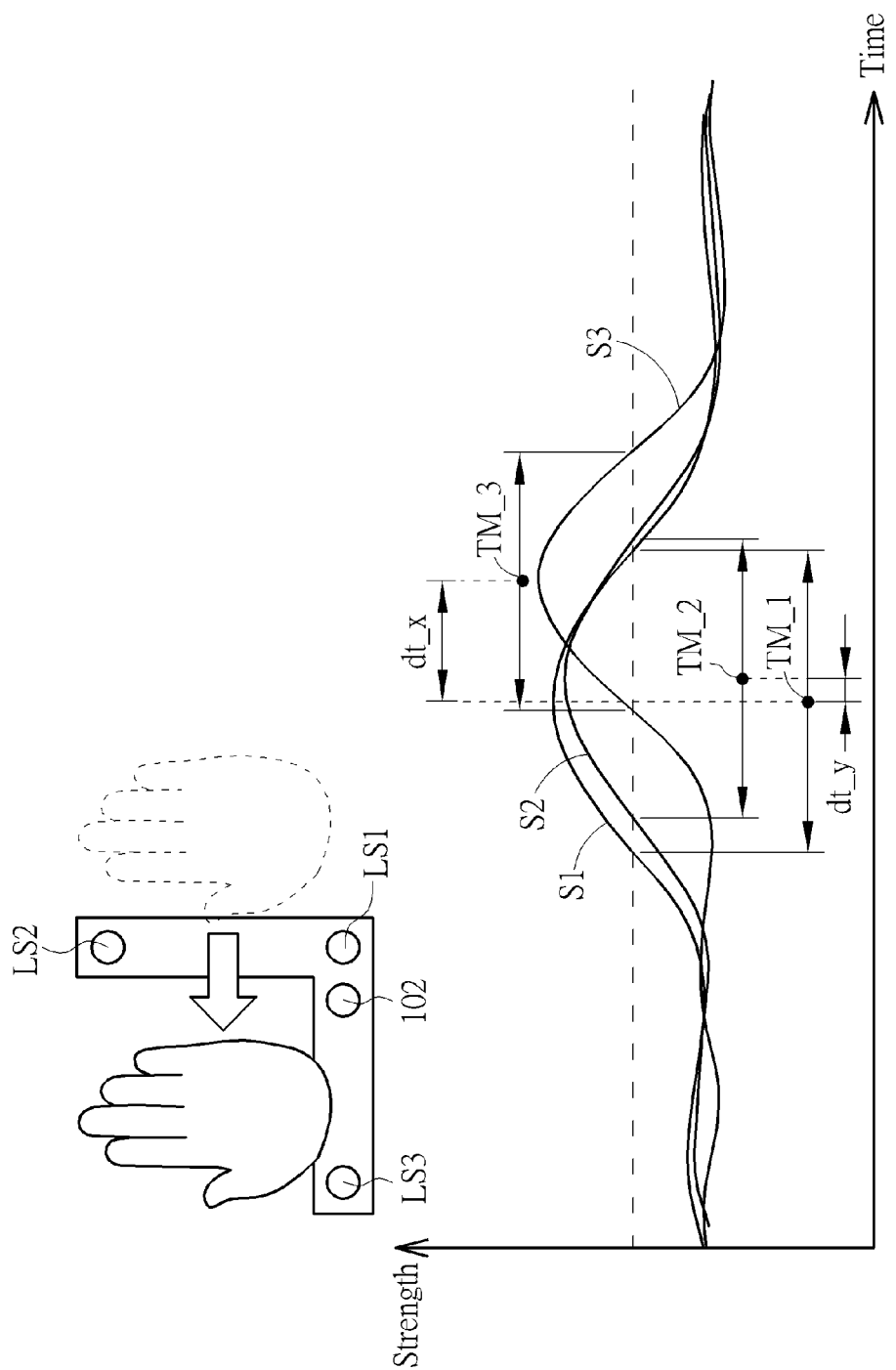
FIG. 6 is a waveform diagram of the strengths of the light wave signals reflected by an object when the object detector detects that the object passes by according to an embodiment of the present invention.

FIG. 6 is a waveform diagram of the strengths of the light wave signals S1-S3 reflected by an object when the object detector 10 detects that the object passes by according to an embodiment of the present invention. When the object (i.e. the hand) approaches the front of the object detector 10, the strengths of the light wave signals S1-S3 reflected by the object all happen to be greater than the threshold value TH. If the object passes through the front of the object detector 10, the light wave signals S1-S3 reflected by the object may appear to be a waveform with a rising followed by a falling. The strengths of the light wave signal S1 and the light wave signal S2 rise to a larger value at substantially the same time, and the strength of the light wave signal S3 rises to a larger value later. According to the strength variation sequence of the light wave signals S1-S3, the processing means 104 may determine that the object is moving leftward.

In detail, the processing means 104 may record an entering time TE_1 of the object entering the front of the object detector 10 when detecting that the strength of the light wave signal S1 reflected by the object rises to be greater than the threshold value TH, and record an exiting time TX_1 of the object exiting the front of the object detector 10 when detecting that the strength of the light wave signal S1 reflected by the object falls to be less than the threshold value TH. The processing means 104 then calculates a middle time TM_1 corresponding to the light wave signal S1 according to the entering time TE_1 and the exiting time TX_1. The middle time TM_1 may be calculated as follows:

$$TM\_1 = TE\_1 + \frac{TX\_1 - TE\_1}{2}$$

Similarly, the processing means 104 may record an entering time TE_2 of the object entering the front of the object detector 10 when detecting that the strength of the light wave signal S2 reflected by the object rises to be greater than the threshold value TH, and record an exiting time TX_2 of the object exiting the front of the object detector 10 when detecting that the strength of the light wave signal S2 reflected by the object falls to be less than the threshold value TH. The processing means 104 then calculates a middle time TM_2 corresponding to the light wave signal S2 according to the entering time TE_2 and the exiting time TX_2. The middle time TM_2 may be calculated as follows:

$$TM\_2 = TE\_2 + \frac{TX\_2 - TE\_2}{2}$$

Similarly, the processing means 104 may record an entering time TE_3 of the object entering the front of the object detector 10 when detecting that the strength of the light wave signal S3 reflected by the object rises to be greater than the threshold value TH, and record an exiting time TX_3 of the object exiting the front of the object detector 10 when detecting that the strength of the light wave signal S3 reflected by the object falls to be less than the threshold value TH. The processing means 104 then calculates a middle time TM_3 corresponding to the light wave signal S3 according to the entering time TE_3 and the exiting time TX_3. The middle time TM_3 may be calculated as follows:

$$TM\_3 = TE\_3 + \frac{TX\_3 - TE\_3}{2}$$

The processing means 104 then determines the displacement of the object according to the middle times TM_1-TM_3. Since the light source LS2 is located above the light source LS1, the processing means 104 may determine the displacement of the object along the vertical direction (i.e. the first direction of the process 30) according to the middle time TM_1 and the middle time TM_2. Since the light source LS3 is located in the left hand side of the light source LS1, the processing means 104 may determine the displacement of the object along the horizontal direction (i.e. the second direction of the process 30) according to the middle time TM_1 and the middle time TM_3. More specifically, the processing means 104 may calculate a displacement dt_y of the object along the vertical direction when the object passes through the front of the object detector 10 according to the absolute difference of the middle time TM_1 and the middle time TM_2. The processing means 104 may also calculate a displacement dt_x of the object along the horizontal direction when the object passes through the front of the object detector 10 according to the absolute difference of the middle time TM_1 and the middle time TM_3. The detailed calculation is described as follows:

$$dt\_x = |TM\_1 - TM\_3|$$

$$dt\_y = |TM\_1 - TM\_2|$$

According to the above calculations, when the displacement dt_y of the object along the vertical direction is greater than the displacement dt_x of the object along the horizontal direction, the processing means 104 may determine that the object is moving along the vertical direction; and when the displacement dt_y of the object along the vertical direction is less than the displacement dt_x of the object along the horizontal direction, the processing means 104 may determine that the object is moving along the horizontal direction.

As shown in FIG. 6, the processing means 104 may first obtain the entering times TE_1-TE_3 and the exiting times TX_1-TX_3 corresponding to the light wave signals S1-S3, respectively, reflected by the object according to the strengths of the light wave signals S1-S3 received by the receiver 102. The middle times TM_1-TM_3 corresponding to the light wave signals S1-S3 reflected by the object may be calculated by the abovementioned methods. The processing means 104 then calculates the displacement dt_y of the object along the vertical direction and the displacement dt_x of the object along the horizontal direction when the object passes through the front of the object detector 10. As can be seen in the waveforms of FIG. 6, the displacement dt_x along the horizontal direction is greater than the displacement dt_y along the vertical direction, and the middle time TM_3 is later than the middle time TM_1 and the middle time TM_2; hence, the processing means 104 may determine that the object is moving leftward, which further determines that the user performs a leftward gesture.

Figure 7:
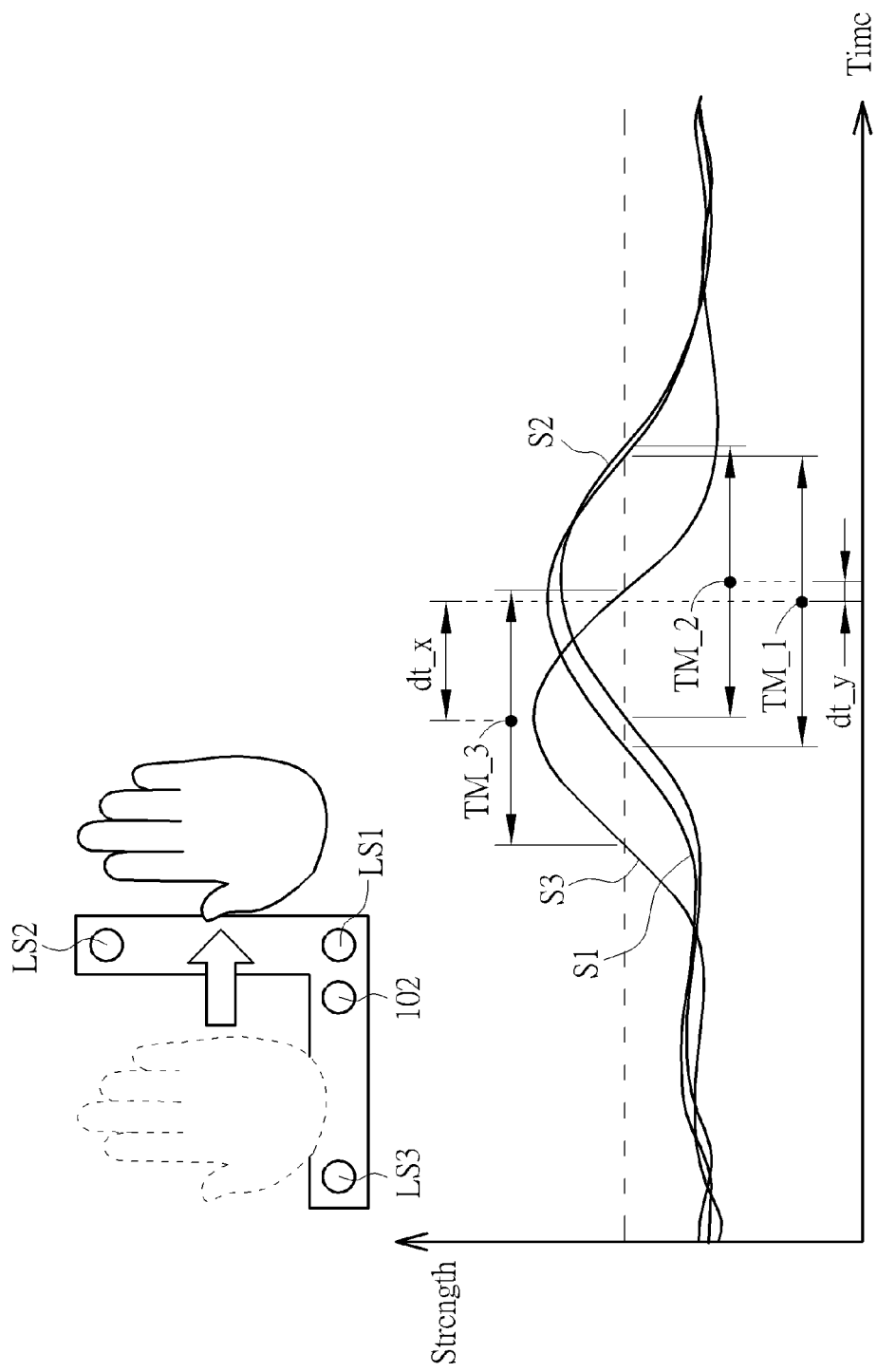
FIG. 7 is a waveform diagram of the strengths of the light wave signals reflected by an object when the object detector detects that the object passes by according to an embodiment of the present invention.

FIG. 7 is a waveform diagram of the strengths of the light wave signals S1-S3 reflected by an object when the object detector 10 detects that the object passes by according to an embodiment of the present invention. In FIG. 7, the strengths of the light wave signal S1 and the light wave signal S2 rise to a larger value at substantially the same time, and the strength of the light wave signal S3 rises to a larger value earlier. According to the strength variation sequence of the light wave signals S1-S3, the processing means 104 may determine that the object is moving rightward.

More specifically, the processing means 104 may first obtain the entering times TE_1-TE_3 and the exiting times TX_1-TX_3 corresponding to the light wave signals S1-S3, respectively, reflected by the object according to the strengths of the light wave signals S1-S3 received by the receiver 102. The middle times TM_1-TM_3 corresponding to the light wave signals S1-S3 reflected by the object may be calculated by the abovementioned methods. The processing means 104 then calculates the displacement dt_y of the object along the vertical direction and the displacement dt_x of the object along the horizontal direction when the object passes through the front of the object detector 10. As can be seen in the waveforms of FIG. 7, the displacement dt_x along the horizontal direction is greater than the displacement dt_y along the vertical direction, and the middle time TM_3 is earlier than the middle time TM_1 and the middle time TM_2; hence, the processing means 104 may determine that the object is moving rightward, which further determines that the user performs a rightward gesture.

Figure 8:
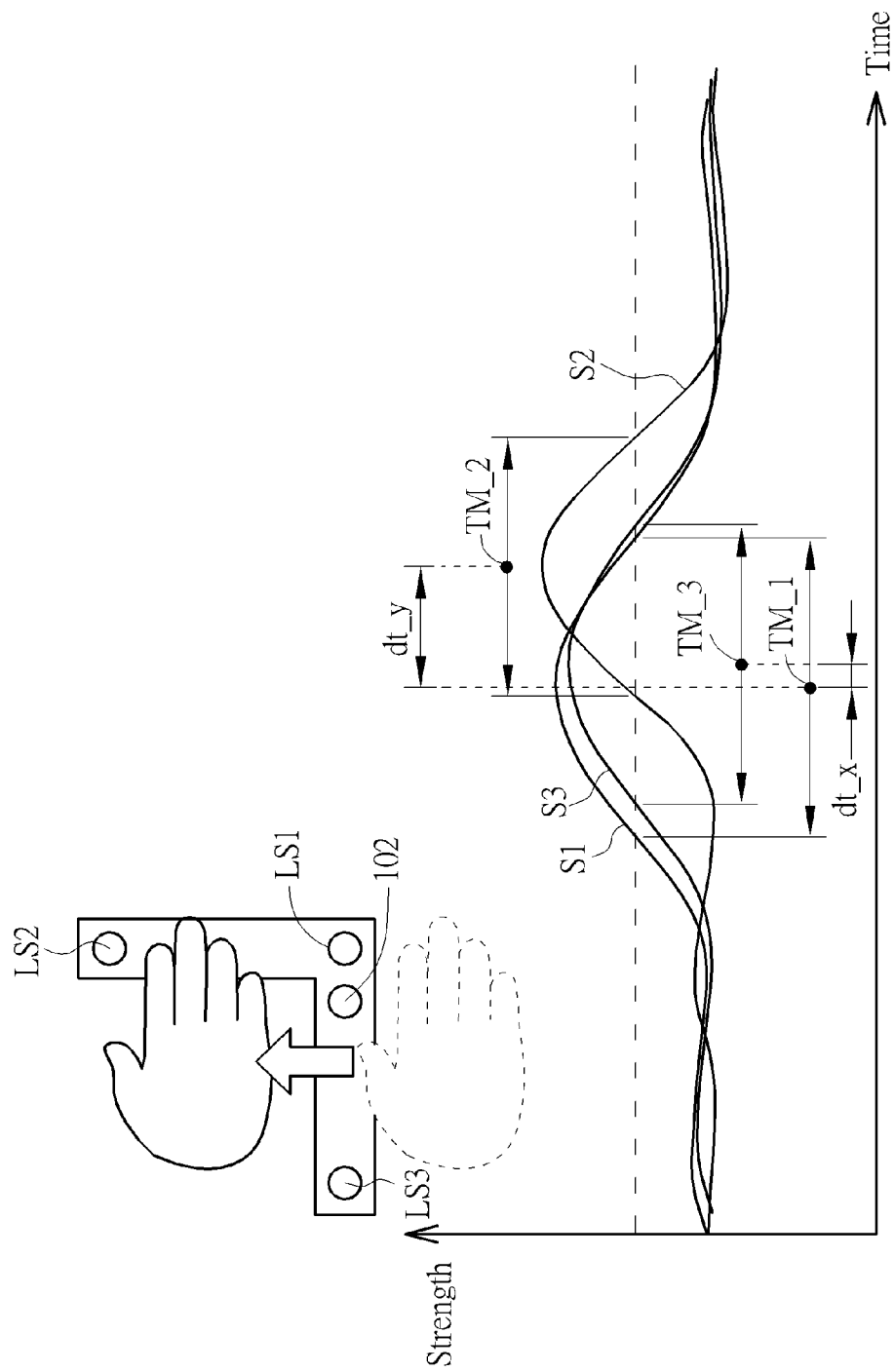
FIG. 8 is a waveform diagram of the strengths of the light wave signals reflected by an object when the object detector detects that the object passes by according to an embodiment of the present invention.

FIG. 8 is a waveform diagram of the strengths of the light wave signals S1-S3 reflected by an object when the object detector 10 detects that the object passes by according to an embodiment of the present invention. In FIG. 8, the strengths of the light wave signal S1 and the light wave signal S3 rise to a larger value at substantially the same time, and the strength of the light wave signal S2 rises to a larger value later. According to the strength variation sequence of the light wave signals S1-S3, the processing means 104 may determine that the object is moving upward.

More specifically, the processing means 104 may first obtain the entering times TE_1-TE_3 and the exiting times TX_1-TX_3 corresponding to the light wave signals S1-S3, respectively, reflected by the object according to the strengths of the light wave signals S1-S3 received by the receiver 102. The middle times TM_1-TM_3 corresponding to the light wave signals S1-S3 reflected by the object may be calculated by the abovementioned methods. The processing means 104 then calculates the displacement dt_y of the object along the vertical direction and the displacement dt_x of the object along the horizontal direction when the object passes through the front of the object detector 10. As can be seen in the waveforms of FIG. 8, the displacement dt_y along the vertical direction is greater than the displacement dt_x along the horizontal direction, and the middle time TM_2 is later than the middle time TM_1 and the middle time TM_3; hence, the processing means 104 may determine that the object is moving upward, which further determines that the user performs an upward gesture.

Figure 9:
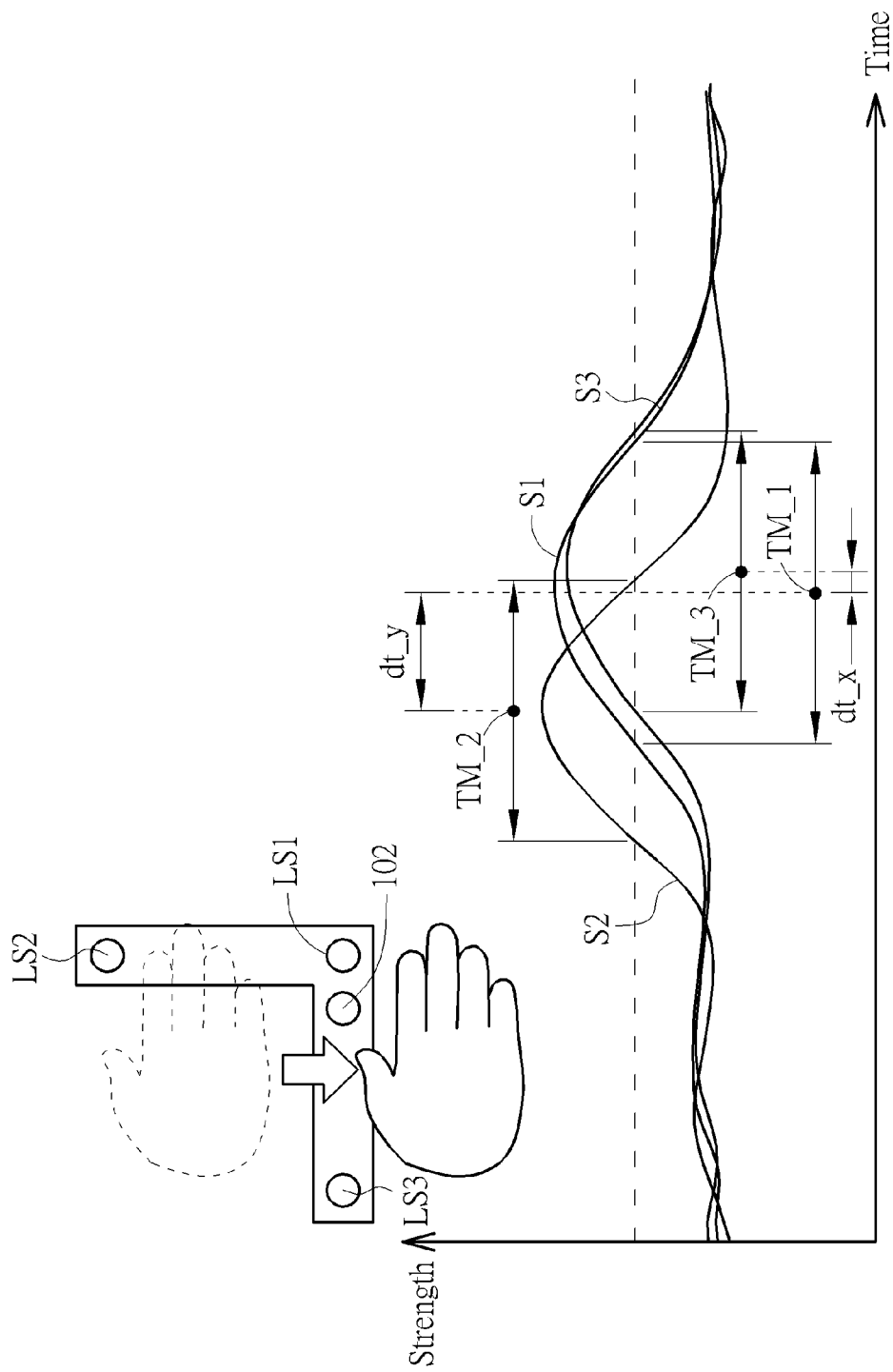
FIG. 9 is a waveform diagram of the strengths of the light wave signals reflected by an object when the object detector detects that the object passes by according to an embodiment of the present invention.

FIG. 9 is a waveform diagram of the strengths of the light wave signals S1-S3 reflected by an object when the object detector 10 detects that the object passes by according to an embodiment of the present invention. In FIG. 9, the strengths of the light wave signal S1 and the light wave signal S3 rise to a larger value at substantially the same time, and the strength of the light wave signal S2 rises to a larger value earlier. According to the strength variation sequence of the light wave signals S1-S3, the processing means 104 may determine that the object is moving downward.

More specifically, the processing means 104 may first obtain the entering times TE_1-TE_3 and the exiting times TX_1-TX_3 corresponding to the light wave signals S1-S3, respectively, reflected by the object according to the strengths of the light wave signals S1-S3 received by the receiver 102. The middle times TM_1-TM_3 corresponding to the light wave signals S1-S3 reflected by the object may be calculated by the abovementioned methods. The processing means 104 then calculates the displacement dt_y of the object along the vertical direction and the displacement dt_x of the object along the horizontal direction when the object passes through the front of the object detector 10. As can be seen in the waveforms of FIG. 9, the displacement dt_y along the vertical direction is greater than the displacement dt_x along the horizontal direction, and the middle time TM_2 is earlier than the middle time TM_1 and the middle time TM_3; hence, the processing means 104 may determine that the object is moving downward, which further determines that the user performs a downward gesture.

Figure 10:
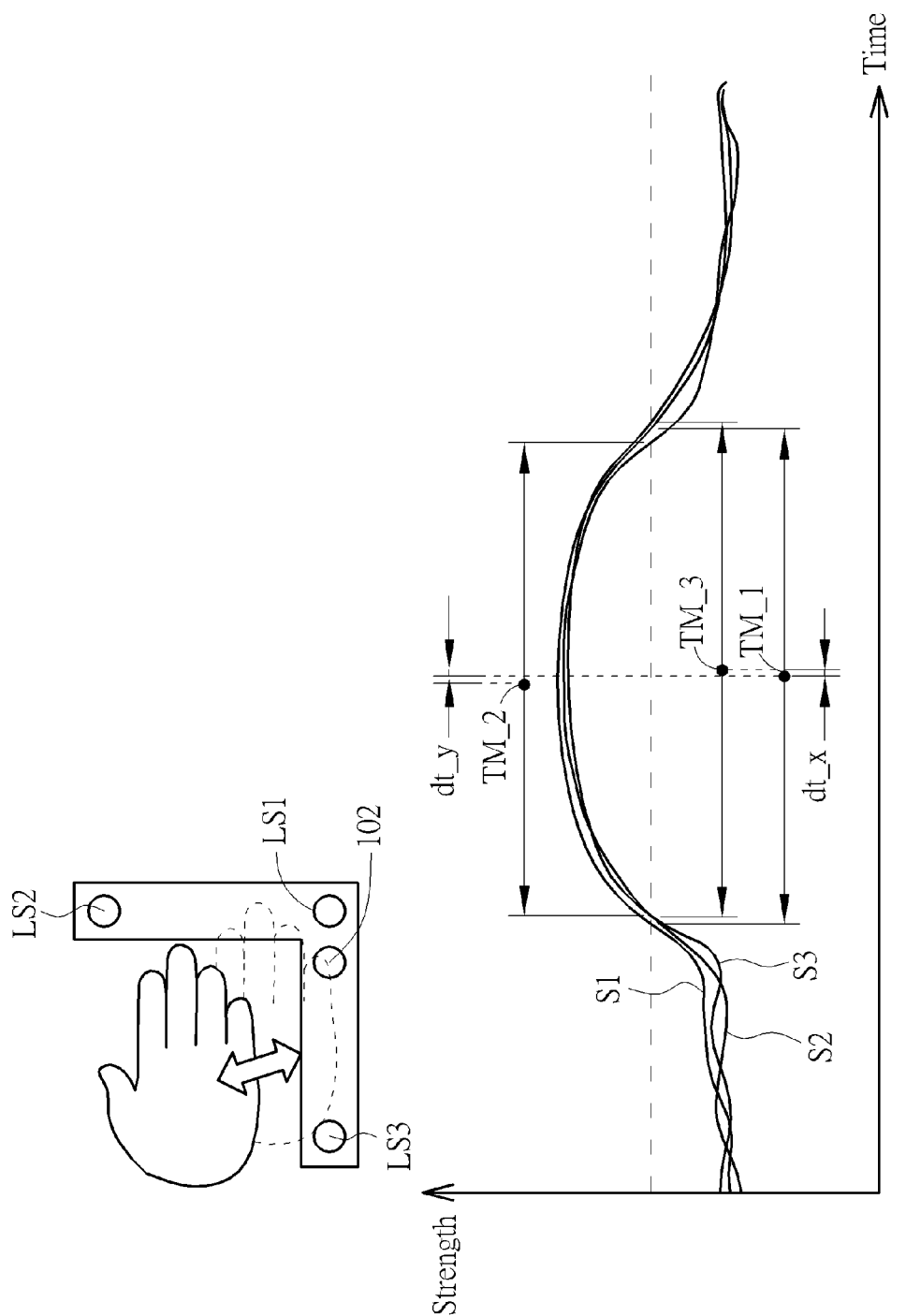
FIG. 10 is a waveform diagram of the strengths of the light wave signals reflected by an object when the object detector detects that the object passes by according to an embodiment of the present invention.

FIG. 10 is a waveform diagram of the strengths of the light wave signals S1-S3 reflected by an object when the object detector 10 detects that the object passes by according to an embodiment of the present invention. In FIG. 10, the strengths of the light wave signal S1, the light wave signal S2 and the light wave signal S3 rise to a larger value at substantially the same time.

The processing means 104 may first obtain the entering times TE_1-TE_3 and the exiting times TX_1-TX_3 corresponding to the light wave signals S1-S3, respectively, reflected by the object according to the strengths of the light wave signals S1-S3 received by the receiver 102. The middle times TM_1-TM_3 corresponding to the light wave signals S1-S3 reflected by the object may be calculated by the abovementioned methods. The processing means 104 then calculates the displacement dt_y of the object along the vertical direction and the displacement dt_x of the object along the horizontal direction when the object passes through the front of the object detector 10. As can be seen in the waveforms of FIG. 10, the displacement dt_y along the vertical direction and the displacement dt_x along the horizontal direction are quite small, and the middle times TM_1-TM_3 are close to each other; hence, the object may approach the object detector 10 and then depart from the object detector 10. In such a situation, when the object detector 10 detects the gesture of the user, the processing means 104 may determine that the gesture is a confirmation gesture since the object detector 10 may not be able to determine the direction of the gesture. This confirmation gesture may denote a confirmation of volume adjustment or program selection, or an input confirmation of other functions.

In an embodiment, the abovementioned confirmation gesture may be determined by using a more explicit determination method. For example, a threshold value TH_d corresponding to the displacement dt_y along the vertical direction and the displacement dt_x along the horizontal direction may be set. When the displacement dt_y along the vertical direction and the displacement dt_x along the horizontal direction are both less than the threshold value TH_d, the processing means 104 may determine that the user performs a confirmation gesture. The threshold value TH_d may be determined based on the speed of the user waving his/her hand to control an electronic device in a general condition, and may also be adjusted according to the cycle of the object detector 10 transmitting the light wave signals S1-S3 to detect the object. For example, if the detection cycle of the object detector 10 is equal to 10 milliseconds, the threshold value TH_d may be set to be 1.5 times the detection cycle, i.e. 15 milliseconds. In such a condition, when the displacement dt_y along the vertical direction and the displacement dt_x along the horizontal direction are both less than 15 milliseconds, the processing means 104 may determine that the user performs a confirmation gesture.

By using the above methods, the object detector 10 may obtain the gesture direction or the confirmation gesture of the user in order to determine certain operations, such as power on/off, program selection, volume control and menu management.

Note that the object detection method and object detector of the present invention may perform the operations of an electronic device via detection of a user's gesture. Those skilled in the art can make modifications and alternations accordingly. For example, the above methods of determining the moving direction of the object is performed by using the predefined threshold value TH to determine the entering times TE_1-TE_3 and the exiting times TX_1-TX_3 corresponding to the light wave signals S1-S3 reflected by the object, and then obtain the middle times TM_1-TM_3 to perform gesture determination. In other embodiments, the middle times TM_1-TM_3 may also be estimated according to the maximum value of the waveforms of the light wave signals S1-S3 reflected by the object, or the moving direction of the object may be determined by other methods, which are not limited herein.

Figure 11:
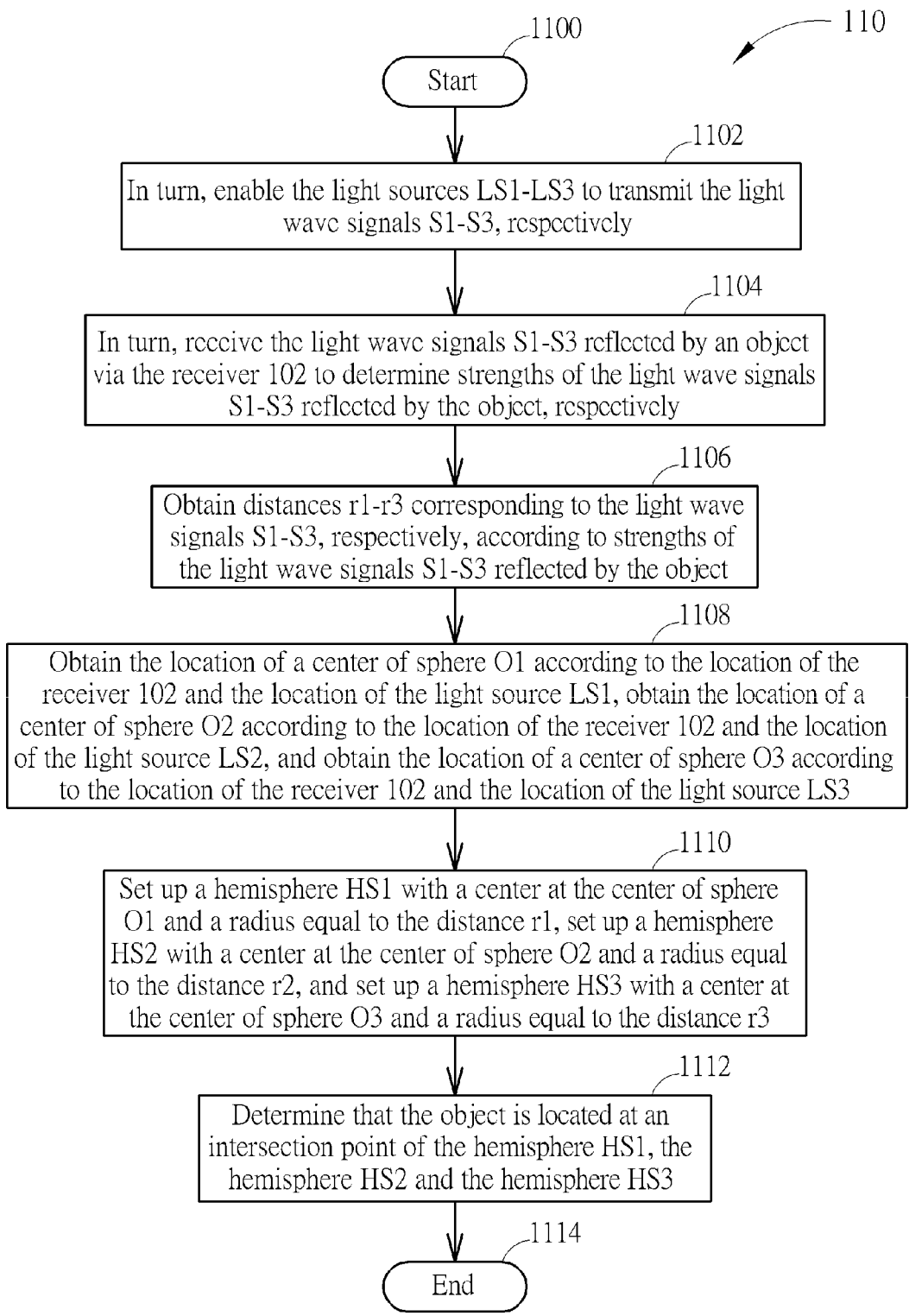
FIG. 11 is a schematic diagram of a process according to an embodiment of the present invention.

FIG. 11 is a schematic diagram of a process 110 according to an embodiment of the present invention. The process 110 is utilized in the object detector 10 for object detection. The process 110, which may be compiled into the program 108, includes the following steps:

Step 1100: Start.

Step 1102: In turn, enable the light sources LS1-LS3 to transmit the light wave signals S1-S3, respectively.

Step 1104: In turn, receive the light wave signals S1-S3 reflected by an object via the receiver 102 to determine strengths of the light wave signals S1-S3 reflected by the object, respectively.

Step 1106: Obtain distances r1-r3 corresponding to the light wave signals S1-S3, respectively, according to strengths of the light wave signals S1-S3 reflected by the object.

Step 1108: Obtain the location of a center of sphere O1 according to the location of the receiver 102 and the location of the light source LS1, obtain the location of a center of sphere O2 according to the location of the receiver 102 and the location of the light source LS2, and obtain the location of a center of sphere O3 according to the location of the receiver 102 and the location of the light source LS3.

Step 1110: Set up a hemisphere HS1 with a center at the center of sphere O1 and a radius equal to the distance r1, set up a hemisphere HS2 with a center at the center of sphere O2 and a radius equal to the distance r2, and set up a hemisphere HS3 with a center at the center of sphere O3 and a radius equal to the distance r3.

Step 1112: Determine that the object is located at an intersection point of the hemisphere HS1, the hemisphere HS2 and the hemisphere HS3.

Step 1114: End.

According to the process 110, the processing means 104 may, in turn, enable the light sources LS1-LS3 to transmit the light wave signals S1-S3, respectively. The receiver 102 then, in turn, receives the light wave signals S1-S3 reflected by an object to determine the strengths of the light wave signals S1-S3. Preferably, the processing means 104 may respectively enable the light sources LS1-LS3 in different time slots, in order to transmit the light wave signals S1-S3 with time-division. The related control signals are shown in FIG. 4. Since the light wave signals S1-S3 are transmitted with time-division, the receiver 102 may only receive a light wave signal transmitted by one of the light sources LS1-LS3 at one time. When the receiver 102 receives a light wave signal, the processing means 104 may determine that the received light wave signal is the reflection result of one of the light wave signals S1-S3 according to the receiving time.

The processing means 104 then obtains the distances r1-r3 corresponding to the light wave signals S1-S3, respectively, according to the strengths of the light wave signals S1-S3 reflected by the object. In detail, the strength of each light wave signal may correspond to a distance between the object detector 10 and an object in front of it; that is, the strength of the light wave signal may be higher when the object is closer to the object detector 10 and lower when the object is farther from the object detector 10.

Figure 12:
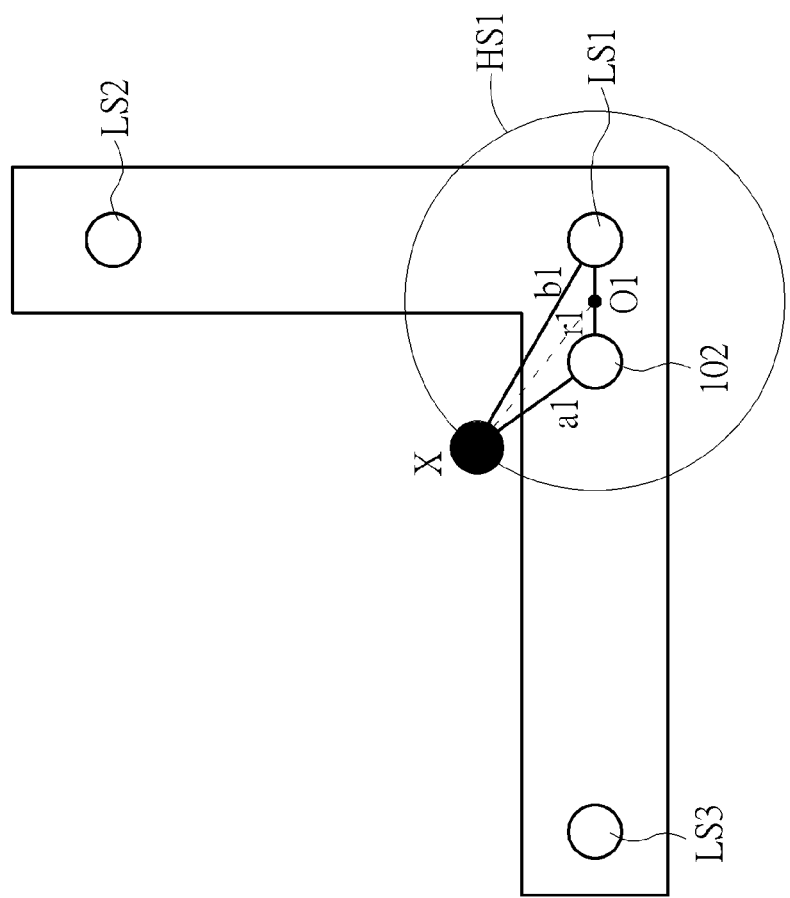
FIG. 12 is a schematic diagram of determining the distance between an object and the object detector according to an embodiment of the present invention.

According to the process 110, the distance between the object and the object detector 10 may be determined as follows. The detection of the light source LS1 and the light wave signal S1 is taken as an example. FIG. 12 is a schematic diagram of determining the distance between an object X and the object detector 10 according to an embodiment of the present invention. In FIG. 12, the light wave signal S1 is transmitted by the light source LS1 and then received by the receiver 102 via the object X. In such a situation, the path length of the light wave signal S1 may be equal to a1+b1. The strength of the light wave signal S1 received by the receiver 102 is inversely related to the path length of the light wave signal S1. When the strength of the received light wave signal S1 is higher, the path length a1+b1 the light wave signal S1 passes through may be shorter. When the strength of the received light wave signal S1 is lower, the path length a1+b1 the light wave signal S1 passes through may be longer. The processing means 104 can thereby determine the relationship between the strength of the light wave signal S1 and the path length a1+b1.

The processing means 104 then obtains the location of the center of sphere O1 according to the location of the receiver 102 and the location of the light source LS1, so that the distance between the object X and the object detector 10 may be determined to be the distance r1 between the object X and the center of sphere O1. Preferably, the center of sphere O1 may be located at the midpoint of the linear distance between the receiver 102 and the light source LS1, so that the distance r1 between the object X and the center of sphere O1 may approximately be equal to half the path length a1+b1 the light wave signal S1 passes through. In such a situation, the processing means 104 may obtain a relationship between the strength of the light wave signal S1 and the distance r1. The processing means 104 can thereby obtain the corresponding distance r1 according to the strength of the received light wave signal S1. Similarly, by the abovementioned methods, the processing means 104 may also obtain the distance r2 corresponding to the strength of the received light wave signal S2, and obtain the distance r3 corresponding to the strength of the received light wave signal S3. The processing means 104 may also set the location of the center of sphere O2 to be the midpoint of the linear distance between the receiver 102 and the light source LS2, and set the location of the center of sphere O3 to be the midpoint of the linear distance between the receiver 102 and the light source LS3.

Figure 13:
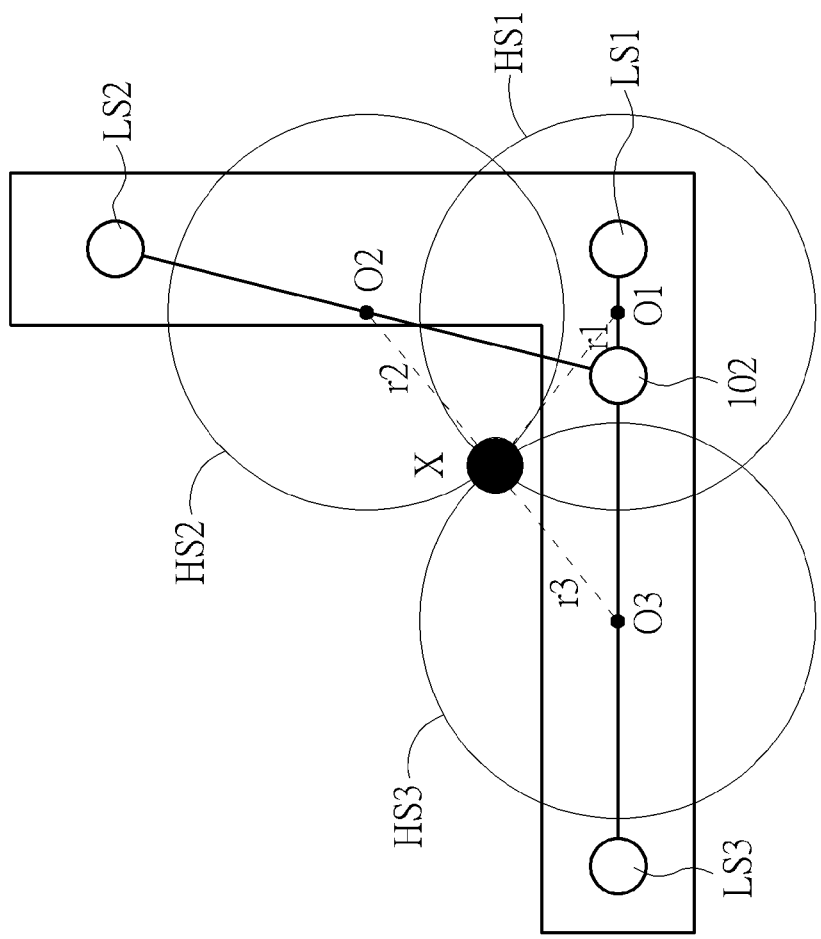
FIG. 13 is a schematic diagram of the processing means determining the location of the object according to an embodiment of the present invention.

According to the distance r1 between the object X and the center of sphere O1, the processing means 104 may set up a hemisphere HS1 with a center at the center of sphere O1 and a radius equal to the distance r1, which means that the object X is located on the hemisphere HS1. Since the light wave signal S1 can only be transmitted to an object in front of the object detector 10, only the hemisphere in front of the object detector 10 should be considered. By the same methods, the processing means 104 may set up a hemisphere HS2 with a center at the center of sphere O2 and a radius equal to the distance r2, and set up a hemisphere HS3 with a center at the center of sphere O3 and a radius equal to the distance r3. The hemispheres HS1-HS3 may have an intersection point, and the processing means 104 may determine that the object X is located at the intersection point, as shown in FIG. 13.

Furthermore, the processing means 104 may continuously detect the locations of the object X within a period of time using the abovementioned methods. The trajectory of the object X may be determined by the processing means 104 based on the locations detected at different times. If the object X is a user's hand, the processing means 104 may determine the operations performed by the user according to the moving direction of the hand.

Figure 14:
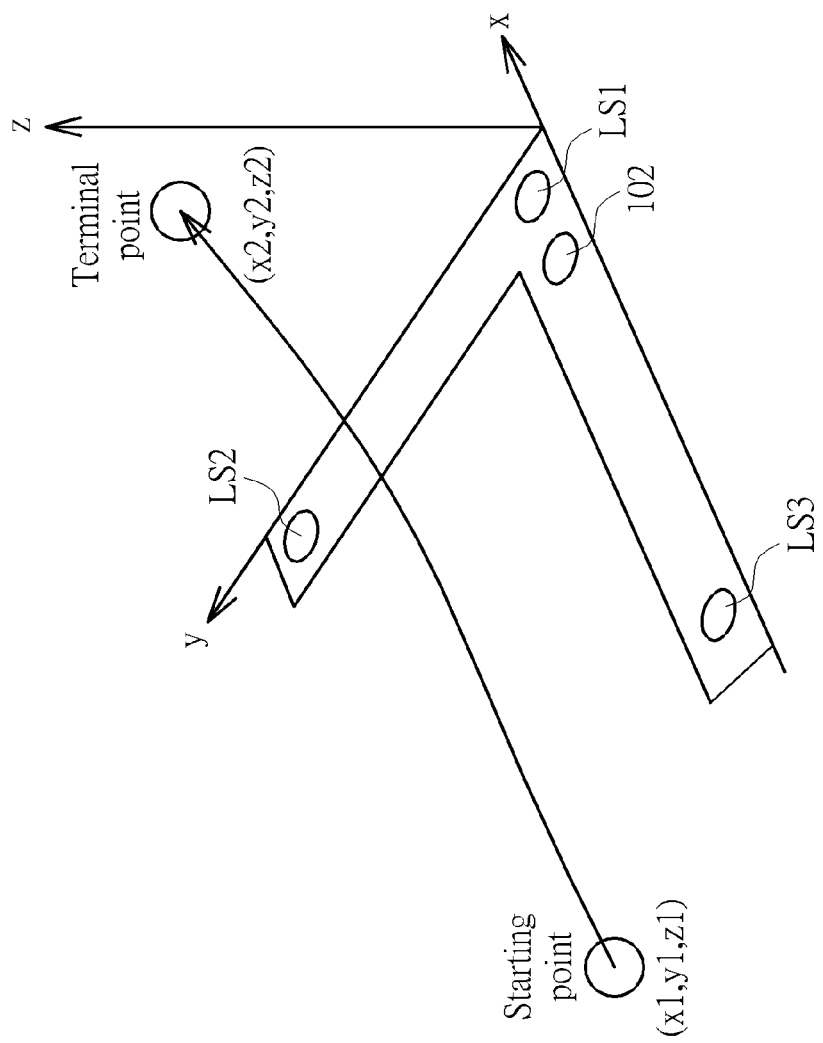
FIG. 14 is a schematic diagram of the processing means determining gestures according to coordinates of the object according to an embodiment of the present invention.

In an embodiment, the processing means 104 may perform gesture determination according to the coordinates of a starting point and a terminal point of the object X passing through the front of the object detector 10. FIG. 14 is a schematic diagram of the processing means 104 determining gestures according to coordinates of the object X according to an embodiment of the present invention. The processing means 104 may record a starting point coordinate (x1, y1, z1) of the object X when the object X enters the front of the object detector 10, and record a terminal point coordinate (x2, y2, z2) of the object X when the object X exits the front of the object detector 10. The place where the object enters the front of the object detector 10 may be determined according to the abovementioned threshold value TH. The place where the object exits the front of the object detector 10 may be determined according to a last location of the object in a predefined time (e.g. 100 milliseconds) after the object enters the object detector 10, or according to the abovementioned threshold value TH within a predefined time.

According to the starting point coordinate (x1, y1, z1) and the terminal point coordinate (x2, y2, z2) of the object X, the processing means 104 may obtain components of the displacement of the object X along the x-axis, y-axis and z-axis, respectively, i.e. $\Delta x$, $\Delta y$ and $\Delta z$, which are calculated as follows:

$$\Delta x = x2 - x1$$

$$\Delta y = y2 - y1$$

$$\Delta z = z2 - z1$$

After the displacement components $\Delta x$, $\Delta y$ and $\Delta z$ are obtained, the processing means 104 may determine the gesture of the user accordingly. For example, if the light sources LS1-LS3 and the receiver 102 are disposed in the lower right corner of the electronic device 20 as in FIG. 2 and the coordinates are defined as in FIG. 14, the processing means 104 may determine that the user performs a rightward gesture when $|\Delta x|>|\Delta y|$, $|\Delta x|>|\Delta z|$ and $\Delta x>0$; the processing means 104 may determine that the user performs a leftward gesture when $|\Delta x|>|\Delta y|$, $|\Delta x|>|\Delta z|$ and $\Delta x<0$; the processing means 104 may determine that the user performs an upward gesture when $|\Delta y|>|\Delta x|$, $|\Delta y|>|\Delta z|$ and $\Delta y>0$; the processing means 104 may determine that the user performs a downward gesture when $|\Delta y|>|\Delta x|$, $|\Delta y|>|\Delta z|$ and $\Delta y<0$; and the processing means 104 may determine that the user performs a confirmation gesture when $|\Delta z|>|\Delta x|$, $|\Delta z|>|\Delta y|$ and $\Delta z<0$.

By using the above methods, the object detector 10 may obtain the gesture direction or the confirmation gesture of the user, in order to determine operations such as power on/off, program selection, volume control and menu management.

To sum up, the present invention provides an object detection method and an object detector for detecting the location and moving direction of an object. The gesture of a user can thereby be detected, in order to determine the operations of an electronic device according to the gesture. In such a situation, contactless operations may be realized where the user does not need to touch a remote controller or the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection method for an electronic device comprising:
   in turn, enabling a first light source, a second light source and a third light source to transmit a first light wave signal, a second light wave signal and a third light wave signal, respectively;
   in turn, receiving the first light wave signal, the second light wave signal and the third light wave signal reflected by an object to determine strengths of the first light wave signal, the second light wave signal and the third light wave signal, respectively; and
   determining a first displacement of the object along a first direction according to variations of the strengths of the first light wave signal and the second light wave signal reflected by the object, and determining a second displacement of the object along a second direction according to variations of the strengths of the first light wave signal and the third light wave signal reflected by the object, wherein the first direction is substantially perpendicular to the second direction;

wherein the first displacement and the second displacement are generated from moving of the object.

2. The object detection method of claim 1, wherein the step of enabling the first light source, the second light source and the third light source to transmit the first light wave signal, the second light wave signal and the third light wave signal comprises:

respectively enabling the first light source, the second light source and the third light source in different time slots to transmit the first light wave signal, the second light wave signal and the third light wave signal with time-division.

3. The object detection method of claim 1, wherein the second light source is located in the first direction of the first light source, and the third light source is located in the second direction of the first light source.

4. The object detection method of claim 1, wherein the step of determining the first displacement of the object along the first direction and determining the second displacement of the object along the second direction comprises:

recording a first entering time of the object when the strength of the first light wave signal reflected by the object rises to be greater than a first threshold value, recording a first exiting time of the object when the strength of the first light wave signal reflected by the object falls to be less than the first threshold value, and calculating a first middle time according to the first entering time and the first exiting time;

recording a second entering time of the object when the strength of the second light wave signal reflected by the object rises to be greater than the first threshold value, recording a second exiting time of the object when the strength of the second light wave signal reflected by the object falls to be less than the first threshold value, and calculating a second middle time according to the second entering time and the second exiting time;

recording a third entering time of the object when the strength of the third light wave signal reflected by the object rises to be greater than the first threshold value, recording a third exiting time of the object when the strength of the third light wave signal reflected by the object falls to be less than the first threshold value, and calculating a third middle time according to the third entering time and the third exiting time; and determining the first displacement of the object according to the first middle time and the second middle time, and determining the second displacement of the object according to the first middle time and the third middle time.

5. The object detection method of claim 4, further comprising:

determining that the object is moving along the first direction when an absolute difference of the first middle time and the second middle time is greater than an absolute difference of the first middle time and the third middle time; and determining that the object is moving along the second direction when the absolute difference of the first middle time and the second middle time is less than the absolute difference of the first middle time and the third middle time.

6. The object detection method of claim 4, wherein the object is a gesture of a user, and the object detection method determines that the user executes a confirmation gesture when an absolute difference of the first middle time and the second middle time and an absolute difference of the first middle time and the third middle time are both less than a second threshold value.

7. The object detection method of claim 1, wherein the first light wave signal, the second light wave signal and the third light wave signal are infrared, and each of the first light source, the second light source and the third light source is an infrared transmitter.

8. An object detection method for an electronic device comprising:

in turn, enabling a first light source, a second light source and a third light source to transmit a first light wave signal, a second light wave signal and a third light wave signal, respectively;

in turn, receiving the first light wave signal, the second light wave signal and the third light wave signal reflected by an object via a receiver to determine strengths of the first light wave signal, the second light wave signal and the third light wave signal, respectively;

obtaining a first distance, a second distance and a third distance corresponding to the first light wave signal, the second light wave signal and the third light wave signal, respectively, according to strengths of the first light wave signal, the second light wave signal and the third light wave signal reflected by the object;

obtaining a location of a center of a first sphere according to a location of the receiver and a location of the first light source, obtaining a location of a center of a second sphere according to the location of the receiver and a location of the second light source, and obtaining a location of a center of a third sphere according to the location of the receiver and a location of the third light source;

setting up a first hemisphere with a center at the center of the first sphere and a radius equal to the first distance, setting up a second hemisphere with a center at the center of the second sphere and a radius equal to the second distance, and setting up a third hemisphere with a center at the center of the third sphere and a radius equal to the third distance; and determining that the object is located at an intersection point of the first hemisphere, the second hemisphere and the third hemisphere.

9. The object detection method of claim 8, wherein the step of enabling the first light source, the second light source and the third light source to transmit the first light wave signal, the second light wave signal and the third light wave signal comprises:

respectively enabling the first light source, the second light source and the third light source in different time slots to transmit the first light wave signal, the second light wave signal and the third light wave signal with time-division.

10. The object detection method of claim 8, further comprising:

continuously detecting a location of the object within a period of time to determine a trajectory of the object.

11. The object detection method of claim 8, wherein the center of the first sphere is located at a midpoint of a linear distance between the receiver and the first light source, the center of the second sphere is located at a midpoint of a linear distance between the receiver and the second light source, and the center of the third sphere is located at a midpoint of a linear distance between the receiver and the third light source.

12. The object detection method of claim 8, wherein the first light wave signal, the second light wave signal and the third light wave signal are infrared, each of the first light source, the second light source and the third light source is an infrared transmitter, and the receiver is an infrared receiver.

13. An object detector, comprising:
a first light source, a second light source and a third light source, for transmitting a first light wave signal, a second light wave signal and a third light wave signal, respectively;
a receiver, for receiving the first light wave signal, the second light wave signal and the third light wave signal reflected by an object;
a processing means; and
a storage unit, for storing a program for instructing the processing means to execute the following steps:
in turn, enabling the first light source, the second light source and the third light source to, in turn, transmit the first light wave signal, the second light wave signal and the third light wave signal;
determining strengths of the first light wave signal, the second light wave signal and the third light wave signal reflected by the object according to the first light wave signal, the second light wave signal and the third light wave signal received by the receiver; and
determining a displacement of the object according to the strengths of the first light wave signal, the second light wave signal and the third light wave signal reflected by the object;
wherein the displacement is generated from moving of the object;
wherein the step of determining the displacement of the object according to the strengths of the first light wave signal, the second light wave signal and the third light wave signal reflected by the object comprises:
determining a first displacement of the object along a first direction according to variations of the strengths of the first light wave signal and the second light wave signal reflected by the object, and determining a second displacement of the object along a second direction according to variations of the strengths of the first light wave signal and the third light wave signal reflected by the object, wherein the first direction is substantially perpendicular to the second direction.

14. The object detector of claim 13, wherein the step of determining the displacement of the object according to the strengths of the first light wave signal, the second light wave signal and the third light wave signal reflected by the object comprises:
obtaining a first distance, a second distance and a third distance corresponding to the first light wave signal, the second light wave signal and the third light wave signal reflected by the object, respectively, according to the strengths of the first light wave signal, the second light wave signal and the third light wave signal;
obtaining a location of a center of a first sphere according to a location of the receiver and a location of the first light source, obtaining a location of a center of a second sphere according to the location of the receiver and a location of the second light source, and obtaining a location of a center of a third sphere according to the location of the receiver and a location of the third light source;
setting up a first hemisphere with a center at the center of the first sphere and a radius equal to the first distance, setting up a second hemisphere with a center at the center of the second sphere and a radius equal to the second distance, and setting up a third hemisphere with a center at the center of the third sphere and a radius equal to the third distance; and
determining that the object is located at an intersection point of the first hemisphere, the second hemisphere and the third hemisphere.

15. The object detector of claim 14, wherein the step of determining the displacement of the object according to the strengths of the first light wave signal, the second light wave signal and the third light wave signal reflected by the object further comprises:
continuously obtaining a location of the object within a period of time to determine a trajectory of the object.

16. The object detector of claim 13, wherein the first light source, the second light source and the third light source are respectively enabled in different time slots to transmit the first light wave signal, the second light wave signal and the third light wave signal with time-division.

17. The object detector of claim 13, wherein the first light wave signal, the second light wave signal and the third light wave signal are infrared, each of the first light source, the second light source and the third light source is an infrared transmitter, and the receiver is an infrared receiver.

* * * * *